United States Patent Office 3,365,511
Patented Jan. 23, 1968

3,365,511
PROCESS FOR SELECTIVELY HYDROGENATING OLEFIN IMPURITIES IN TERMINAL NEOALKENE STREAMS
Stephen M. Kovach, Highland, Ill., assignor to Sinclair Research, Inc., New York, N.Y., a corporation of Delaware
No Drawing. Filed Aug. 25, 1965, Ser. No. 482,630
14 Claims. (Cl. 260—677)

ABSTRACT OF THE DISCLOSURE

Olefinic impurities present in neoalkene terminal olefins and boiling in the same range as said neoalkene olefins are selectively hydrogenated, to facilitate subsequent removal, by contacting with molecular hydrogen under hydrogenation conditions and in the presence of a catalyst consisting essentially of an oxide of cobalt or nickel supported on activated, high area charcoal, for example, coconut charcoal. The process is especially useful for hydrogenating olefinic impurities present in crude neohexene streams.

---

This invention relates to the selective hydrogenation of olefinic impurities present in neoalkene terminal olefins. By neoalkene terminal olefin is meant a quaternary carbon-containing olefin wherein the ethylenic unsaturation exists between the alpha and beta carbon atoms.

The neoalkene terminal olefins have been found to be valuable for the production of polymers of high melting points and polymers possessing other highly desirable characteristics. For example, it has been reported in Linear and Stereoregular Addition Polymers, Gaylor and Mark, Interscience Publishers, Inc., New York, 1959, p. 64, that isotactic poly-3,3-dimethyl-1-butene, i.e. polyneohexene, has been made using a conventional peroxide catalyzed polymerization process, which polymer is characterized by being flexible and extensible.

The production of neoalkene terminal olefins can be obtained by several methods. Two methods are (1) catalytic dehydrogenation of the parent alkane, and (2) pyrolysis of corresponding alkyl esters or halides.

Although one of the more practical methods of production, pyrolysis of the alkyl halide unfortunately yields, along with the desired neoalkene, contaminating amounts of by-product olefins. These impurities, particularly any diolefin by-products, if not removed have a detrimental effect on the Zeigler polymerization of the neoalkenes, causing cross-linking and branching of the polymer products. Their removal, however, is often difficult and expensive because of the nearly corresponding boiling ranges of the impurities and the product. In the production of neohexene, for example, by the pyrolysis of neohexyl chloride, contaminant quantities of isoprene and isoamylenes are formed as well as smaller amounts of halohydrocarbons. Removal of these impurities can be accomplished by various techniques but to the detriment of neohexene quality and overall yield. The possible purification techniques are distillation, acid-treatment and catalytic hydrogenation. Distillation can yield a pure neohexene fraction, but only at great expense for the necessary sophisticated close fractionation towers employed, and acid-treating to remove isoprene and isoamylene impurities results in some loss of neohexene due to polymerization and isomerization thereof. Catalytic hydrogenation attempts the reduction of olefinic impurities to their lower boiling alkanes, thereby permitting the use of less expensive distillation towers for their removal. The available commercial hydrogenation catalysts are, however, insufficiently selective in their effects on the crude neoalkene stream, since, as in acid-treatment, there results a partial isomerization of the neoalkene. Additional losses of the alkene may result from its hydrogenation to the parent alkane. When hydrogenating crude neohexene, for example, with available commercial catalysts significant quantities of neohexene are isomerized to 2,3-dimethyl-1-butene and further quantities of neohexene are lost through its hydrogenation to neohexane. The latter effect particularly results when the hydrogenation process is conducted at room temperatures or slightly higher.

Accordingly, there is being sought a catalyst which will selectively hydrogenate olefinic impurities present in neoalkene terminal olefins and especially one which will hydrogenate those impurities having boiling point ranges corresponding to the boiling point range of the neoalkene terminal olefin, but which will not unduly effect isomerization, polymerization or hydrogenation of the neoalkene terminal olefin.

I have found that the use of oxides of cobalt or nickel, supported on activated charcoal, as catalysts for the hydrogenation of olefinic impurities in crude terminal neoalkenes, gives results vastly superior to the use of commercially available hydrogenation catalysts. By employing my catalyst under conventional hydrogenation conditions, no significant loss of neoalkene is experienced through polymerization or isomerization thereof; furthermore, a greater proportion of the olefinic impurities present, particularly to diolefins, are successfully reduced to their alkane counterparts than those amounts reduced by commercial catalysts.

The catalysts of this invention may be prepared by a variety of methods well known in the art. One such method is the impregnation of the charcoal support with an aqueous solution of the appropriate metal salt followed by calcination. Conventional calcination conditions may be employed. The atmosphere, temperature and time of calcination each are determined by the requisites of converting the particular metal salt to the oxide form. For example, the heating may be conducted in a nitrogen atmosphere for about 3 hours at about 400° to 700° F. when converting nitrates or formates, at about 800° F. for oxalates or acetates or as high as 1600° F. for sulfates, etc. The catalyst can then be activated by a hydrogen treat at operating conditions or such activation may occur while conducting the hydrogenation reaction. By appropriate metal salt is meant any of the oxygen-containing compounds of cobalt or nickel which under the conditions of calcination will be decomposed to the oxide form. Appropriate salts are, for example, nitrates, oxalates, formates, acetates, sulfates, carbonates, etc. The charcoal carrier should be sufficiently impregnated with the salt solution so that the resultant catalyst composition will contain about 5 to 40% cobalt or nickel, calculated as metal, with about 10 to 30% being preferred. The support should be a high area charcoal, e.g. of at least about 500 square meters per gram, preferably about 1000 to 1800 m.$^2$/g., as determined by the BET method, and preferably is a charcoal prepared from hard wood, soft wood, coconut or nut shells. The less active charcoals from petroleum or coal can also be utilized but they tend to lead to less active catalysts. Coconut charcoal is an especially good carrier. Hydrogenation components other than oxides of cobalt and nickel can be included. Typical hydrogenation components include the oxides and sulfides of Group VIB metals and metals of the platinum series, e.g. platinum, palladium and rhodium. Preferably the platinum series metals, if included, will be present in amounts no greater than about 2 percent by weight of the total catalyst composition; however, the Group VIB metal oxides or sulfides may be present in amounts up to 20 or even 30 weight percent. If platinum series metals are included, they are usually present in amounts of at least 0.1% to be significantly effective; similarly, the Group VIB metals are usually present in amounts of at least about 1% to be effective. The preferred hydrogenation catalyst is one containing oxides of cobalt on an activated coconut charcoal support.

The catalysts of this invention are useful for selectively hydrogenating mono- or di-olefins having boiling point ranges approximate to those of a neo-monoalkene in which they are in admixture and most often having a carbon atom content within about one or two carbon atoms of the neoalkene. The neoalkene has from 6 to about 22 carbon atoms, preferably 6 to about 10 carbon atoms. The hydrogenation process of this invention may be effectively conducted on streams of which at least about 50 weight percent, preferably at least about 85%, is the neoalkene and only a minor amount, for instance, about 0.1 to 10%, preferably about 1 to 5%, is mono- or diolefin impurities. Additional components of the stream may be inert hydrocarbons such as paraffins, etc.

The conditions of hydrogenation include temperatures of from about 50 to 500° F., while temperatures in the range of about 100–400° F., are preferred. Operating pressures may often range from atmospheric to about 3,000 p.s.i.g., with about 100 to 2,000 p.s.i.g. being preferred. In a continuous reaction the catalyst concentration is best defined by weight hourly space velocity (WHSV) that is to say, the weight of feed processed per weight of catalyst per hour. A weight hourly space velocity of about 0.1 to 100 may be used, with the preferred WHSV being about 0.1 to 10. The reaction conditions are usually chosen to effect at least about 50% hydrogenation of the olefinic impurities in the mixture and, preferably sufficient to effect greater than about 75% hydrogenation thereof. Generally a ratio of about 0.2 to 20 moles of molecular hydrogen per mole of olefin mixture will effect the desired degree of hydrogenation, with about 0.4 to 10 moles being preferred. Either a liquid or vapor phase reaction can be employed but the liquid phase reaction is preferred.

The following examples compare the effectiveness of two available hydrogenation catalysts and the catalyst of the present invention in purifying a crude neohexene stream obtained through the pyrolysis of neohexyl chloride.

EXAMPLE I

The crude neohexene feed was hydrogenated in the presence of a catalyst consisting of 0.5 weight percent of palladium on a calcium carbonate support. Conditions of the hydrogen treatment were as follows:

| | |
|---|---|
| Temperature, ° F. | 90 |
| Pressure, p.s.i.g. | 400 |
| LHSV | 10 |
| $H_2$/hydrocarbon feed, mol/mol | 3/1 |

Comparison of the hydrogenated product with the crude stream revealed that, although about 53% of the isoprene contaminant in the feed was successfully hydrogenated, about 10% of the neohexene was lost, mostly through hydrogenation to the alkane and with a slight amount of isomerization to 2,3-dimethyl-1-butene. Furthermore, there was an actual increase in the mono-olefin contaminant, isoamylene, in the product, as compared with the feed.

EXAMPLE II

Purifying the crude neohexene through hydrogenation was attempted with another catalyst consisting of palladium supported on alumina. Conditions of the hydrogen treatment were as follows:

| | |
|---|---|
| Temperature, ° F. | 77 |
| Pressure, p.s.i.g. | 400 |
| LHSV | 10 |
| $H_2$/hydrocarbon feed, mol/mol | 3/1 |

Comparison of the hydrogenated product and crude stream of this run revealed a decrease by about 73% of the isoprene concentration in the crude stream with an accompanying loss of about 16% of the neohexene, mostly through hydrogenation to neohexane with a slight loss through isomerization. The isoamylene concentration was again found to be higher in the product than in the feed.

EXAMPLE III

A crude neohexene stream was hydrogenated over a catalyst of the present invention, cobalt oxide on coconut charcoal containing 16.8 percent by weight of cobalt as metal. The hydrogenation conditions were as follows:

| | |
|---|---|
| Temperature, ° F. | 200 |
| Pressure, p.s.i.g. | 500 |
| LHSV | 0.5 |
| $H_2$/hydrocarbon feed, mol/mol | 1/2 |

Analyses of the hydrogenated product and of the feed showed approximately a 78% decrease in isoprene and a 59% decrease in isoamylene content of the crude neohexene stream. There was, however, no loss of neohexene; production of neohexane and 2,3-dimethyl-1-butene was nil.

Comparison of the hydrogenation selectivity, or lack thereof, of the commercial catalysts to the catalyst of this invention gives evidence of the superiority of the latter. Whereas the commercial catalysts have high activities for hydrogenation of the diolefins (53% of the isoprene component in Example I was hydrogenated by the catalyst of Example I and 73% in Example II was hydrogenated by the second catalyst) they exhibit little or no hydrogenation activity for the isoamylene components. In addition, their hydrogenation activities undesirably extend to the neoalkene component, as evidenced by the hydrogenation of neohexene to neohexane in considerable quantities. Overall the commercial catalysts gave neohexene losses ranging from 10 to 20%. The cobalt oxide-on-charcoal catalyst, on the other hand, exhibits high rates of hydrogenation for both isoamylenes and isoprene in Example III, while effecting no hydrogenation or isomerization of neohexene. It is important to note that whereas with commercial catalysts neohydrocarbons isomerize readily under the mildest of conditions (90 and 77° F. in Examples I and II, respectively) the catalysts of this invention have been found not to initiate isomerization at temperatures up to 500° F.

I claim:

1. A process for selectively hydrogenating a member selected from the group consisting of mono- and di-olefins other than terminal neoalkenes, said member being in admixture with a terminal neoalkene of 6 to 22 carbon atoms and having approximately the same boiling range as said neoalkene, which consists essentially of contacting said mixture with molecular hydrogen under hydrogenation conditions in the presence of a catalyst consisting essentially of an oxide, selected from the group consisting of oxides of cobalt and nickel, deposited upon an activated, high area charcoal support, said oxide being present in amounts from about 5 to 40 weight percent as metal, based on the total catalyst composition.

2. The process of claim 1 wherein the hydrogenation temperature is from about 50 to 500° F.

3. The process of claim 1 wherein the neoalkene has 6 to about 10 carbon atoms.

4. The process of claim 2 wherein the neoalkene is neohexene.

5. The process of claim 2 wherein the olefins consist essentially of isoprene and isoamylene and the terminal neoalkene is neohexene.

6. The process of claim 5 wherein the charcoal support has a surface area of at least about 500 square meters per gram.

7. The process of claim 2 wherein the charcoal support has a surface area of at least about 500 square meters per gram.

8. The process of claim 7 wherein the support is coconut charcoal.

9. The process of claim 8 wherein the neoalkene is neohexene.

10. The process of claim 9 wherein the oxide is cobalt oxide.

11. The process of claim 10 wherein the coconut charcoal support has a surface area of about 1,000 to 1,800 square meters per gram.

12. The process of claim 6 wherein the oxide is cobalt oxide.

13. The process of claim 12 wherein the support is coconut charcoal.

14. The process of claim 13 wherein the coconut charcoal support has a surface area of about 1,000 to 1,800 square meters per gram.

References Cited

UNITED STATES PATENTS 3,116,233   12/1963   Douwes et al. _____ 208—143

FOREIGN PATENTS 920,269   3/1963   Great Britain.
950,952   3/1964   Great Britain.

SAMUEL P. JONES, *Primary Examiner.*